United States Patent [19]

Ichigi

[11] Patent Number: 5,625,726
[45] Date of Patent: Apr. 29, 1997

[54] OPTICAL WAVEGUIDE SUBSTRATE, AN ARTICLE COMPRISING THE SAME AND A SUBSTRATE COUPLED THERETO FOR HOLDING OPTICAL FIBERS

[75] Inventor: Takenori Ichigi, Santa Clara, Calif.

[73] Assignee: NGK Insulators, Ltd., Japan

[21] Appl. No.: 388,056

[22] Filed: Feb. 10, 1995

[51] Int. Cl.$^6$ ................................................. G02B 6/26
[52] U.S. Cl. .............................. 385/14; 385/40; 385/45; 385/47
[58] Field of Search ..................... 385/14, 15, 39–42, 385/45–48

[56] References Cited

U.S. PATENT DOCUMENTS

| | | | |
|---|---|---|---|
| 4,262,995 | 4/1981 | Tangonan | 385/46 |
| 4,831,631 | 5/1989 | Haeussler et al. | 385/14 X |
| 5,111,518 | 5/1992 | Okada | 385/14 |
| 5,191,625 | 3/1993 | Gustavsson | 385/14 |
| 5,361,157 | 11/1994 | Ishikawa et al. | 385/46 X |

FOREIGN PATENT DOCUMENTS

| | | | |
|---|---|---|---|
| 0622646A1 | 4/1993 | European Pat. Off. | |
| 63-306404 | 12/1988 | Japan | 385/47 |

OTHER PUBLICATIONS

Optical Engineering, vol. 28, No. 12, 1 Dec. 1989, pp. 1281–1287, Yasufumi Yamada et al: "Optical Interconnections Using a Silica–Based Waveguide on a Silicon Substrate."

Journal of Lightwave Technology, Jan. 1994, vol. 12, No. 1, pp. 44–48, Becker R. A. et al. "Rugged, low–cost pigtailing approach for LiNbO/sub 3/integrated optic devices".

Conference Proceedings of the 7th European Conference on Optical Communication, Copenhagen, Denmark, 8–11 Sep. 1981, pp. 9.2–1 ff., M.G.F. Wilson et al.: "A single mode stripe waveguide edge reflector for device integration".

Primary Examiner—John D. Lee
Attorney, Agent, or Firm—Parkhurst, Wendel & Burr, L.L.P.

[57] ABSTRACT

The optical waveguide substrate is provided with a branch-type optical waveguide. This optical waveguide is composed of a stem portion provided between one end face and the other end face of the optical waveguide substrate and a plurality of branch portions extending in parallel with the stem portion. The optical waveguide substrate is also provided with a reflecting means for reflecting light transmitted through the stem portion toward the branch portions. Preferably, the optical waveguide is provided with a dividing portion which is continued to both of the stem portion and the branch portions, and a turning portion for optically coupling the branch portion with the stem portion is provided in this dividing portion so that the light transmitted through the stem portion is reflected toward the branch portions at said turning portion. In an active-type optical waveguide device, light modulating electrodes for modulating the light propagating through the branch portions are provided along each branch portion. With these constitutions, the coupling process for coupling the end face of the optical waveguide and that of the optical fiber can be accomplished more easily than the conventional one. Also, even when ambient temperature is largely changed after completion of the coupling between each optical fibers and waveguides through the coupling of the optical waveguide device and the optical fiber holding substrate, there hardly happens a change in the transmission loss of light. Moreover, it is also possible to reduce the length of the optical waveguide device.

15 Claims, 7 Drawing Sheets

OPTICAL WAVEGUIDE SUBSTRATE, AN ARTICLE COMPRISING THE SAME AND A SUBSTRATE COUPLED THERETO FOR HOLDING OPTICAL FIBERS

BACKGROUND OF THE INVENTION

1. Field of the Invention

The present invention relates to an optical waveguide device which is preferably applicable to a light modulator in an optical fiber gyroscope or the like. The present invention also relates to an assembly including such an optical waveguide device and an optical fiber holding substrate.

2. Description of the Related Art

In the fields of optical measurement systems, optical communication systems, etc., it is known to manufacture optical waveguide devices by forming three-dimensional optical waveguides on substrates made of various electrooptic monocrystals, glasses or resins. As for such optical waveguide devices, there have been known optical branch devices, optical modulation devices, optical deflection devices, optical switches, multiplexers, etc. These waveguide-type devices have attracted considerable attention because of advantages such as smallness in size, good stability, reduced driving power and high speed signal transmission.

The present inventor has investigated manufacture of optical waveguide devices through the formation of what is called a three-dimensional optical waveguide of Y-branch type on a substrate made of LiNbO$_3$, and uses of such devices as modulators for fiber optic gyroscopes. The modulator for fiber optic gyroscopes is an instrument for measuring Sagnac effect which is generated when an optical fiber coil is rotated, and is known to have following applications.

(1) Navigation systems for vehicles such as automobiles, aircraft, shipping, etc.

(2) Tilt sensors and rotation sensors for measuring changes in the posture of a vehicle. As the changes in a vehicle posture, mention may be made of a tilt of an automobile caused by sinkage of a suspension, a rolling of an aircraft and the like.

Figure 1:
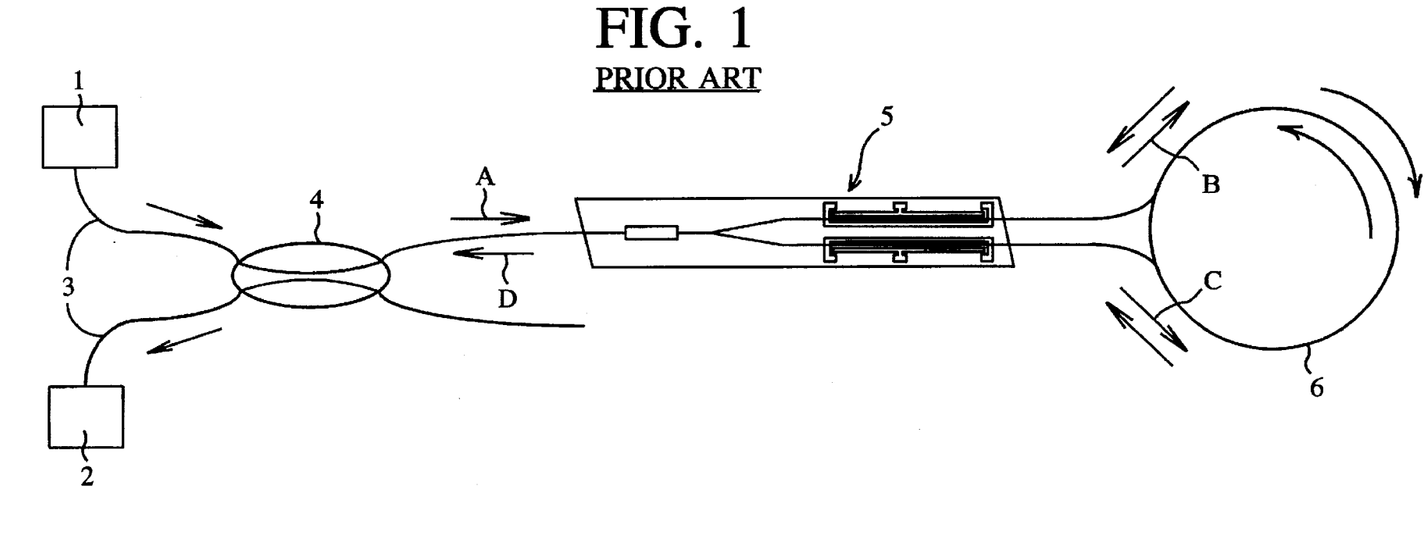
FIG. 1 is a diagram schematically showing a conventional optical waveguide device being in use as the main component of a optical fiber gyroscope.

In FIG. 1, there is schematically shown an example of such fiber optic gyroscopes. Light emitted by a light source 1 is transmitted through an optical fiber 3. The light passes through a fiber coupler 4, propagates as shown by an arrow A and impinges on an optical waveguide substrate 5. The light impinging on the optical waveguide substrate 5 is divided at a Y-shaped dividing point into two branch-waveguides, emanates from the optical waveguide substrate 5, and then impinges on a fiber coil 6. The light emanating from one of the branch-waveguides propagates as shown by an arrow B and is made incident upon the fiber coil 6, while the light emanating from the other branch-waveguide propagates as shown by an arrow C. Both of the light passed through the fiber coil 6 are made incident again on respective branch portions, reversely propagate the above-explained optical paths to the fiber coupler 4 and then impinge on a detector 2. Incidentally, in the optical waveguide substrate 5, a polarizer, a beam splitter and a phase modulator are integrated on a chip-shaped optical waveguide substrate. Due to this constitution, the total production cost of a fiber optic gyroscope can be reduced, while improving the performance thereof.

Figure 2:
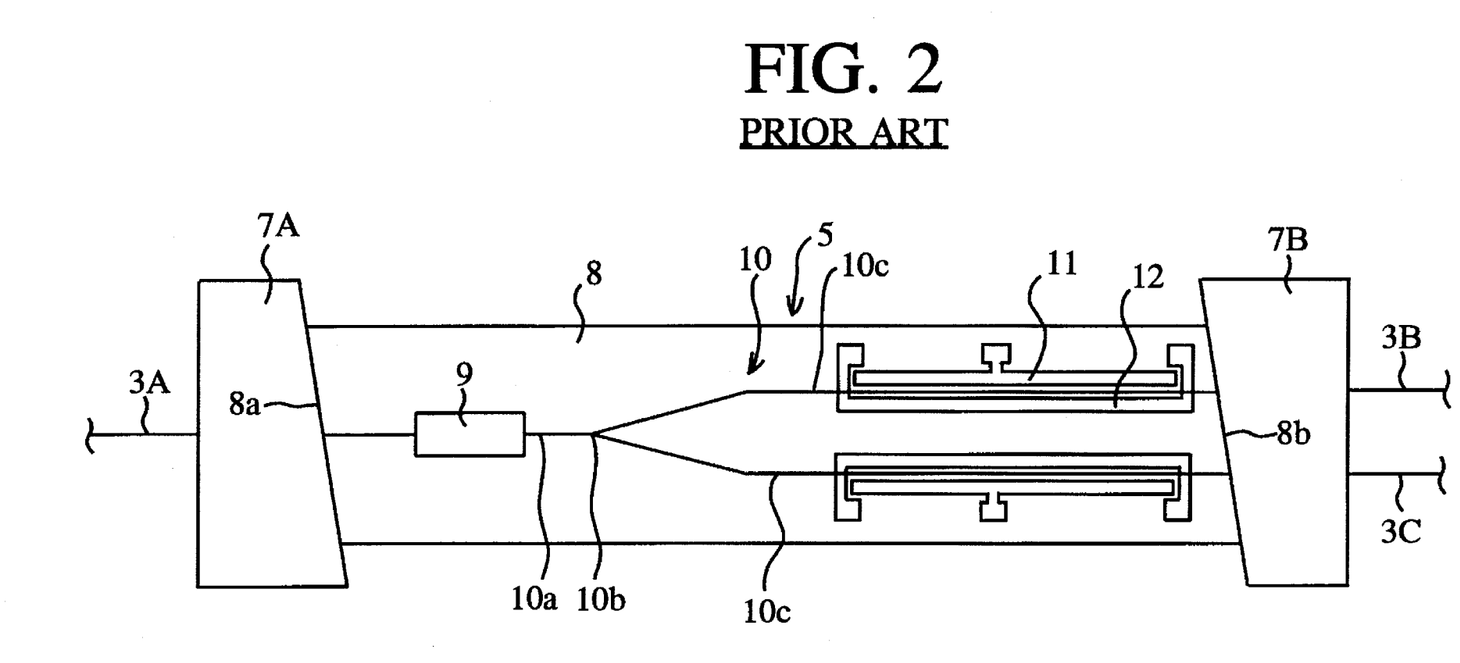
FIG. 2 is a plan view illustrating a light modulator for optical fiber gyroscopes constituted by a conventional optical waveguide device.

FIG. 2 is a plan view illustrating a construction of an example of such optical waveguide device.

A branch-type optical waveguide, what is called a Y-shaped optical waveguide 10 is formed between end faces 8a and 8b of a substrate 8 of the optical waveguide device 5. The optical waveguide 10 is constituted by a stem portion 10a, a dividing point 10b and branch portions 10c, said stem portion, dividing point and branch portions being continuously ranged in this order when viewed from the end face 8a side, and said branch portions 10c extending up to the end face 8b. A polarizer 9 is arranged on the stem portion 10a and controlling electrodes 11 and 12 are formed along each of the branch portions 10c so as to sandwich the branch portion with the electrodes.

In order to align and couple an end face of an optical fiber 3A on the entrance side with that of the stem portion 10a, the terminal portion of the optical fiber 3A is fixedly held by an optical fiber holding substrate 7A and an end face of the holding substrate 7A is adhered onto the end face 8a of the optical waveguide device 5. Similarly, in order to align and couple end faces of optical fibers 3B and 3C on the exit side with those of the branch portions 10c, the end portions of the optical fibers 3B and 3C are fixedly held by an optical fiber holding substrate 7B and an end face of the holding substrate 7B is adhered onto the end face 8b of the optical waveguide device 5.

Although it would be varied depending upon the operation method used, the fiber optic gyroscope is most generally operated in the following manner. Light is incident on the stem portion 10a of the optical waveguide 10 and divided at the dividing point 10b at a ratio of 50:50(%). Then, divided light along one of the branches 10c is phase-modulated by applying a predetermined voltage to the electrodes. A phase difference due to the Sagnac effects, which is generated by the rotation of the optical system 6, is detected by the optical waveguide device. The thus-obtained phase difference is introduced into a formula showing the relation between a rotational angular velocity of the optical system and a phase difference to attain a revolution speed.

SUMMARY OF THE INVENTION

During further investigations of the optical waveguide devices, the present inventor has found the following problems.

In order to couple an optical waveguide device as shown in FIG. 2 with other optical elements and operate them, it is required to optically connect an optical fiber with each waveguide in the device, and for that purpose, it is necessary to couple one or more optical fiber holding substrates with the optical waveguide substrate. Since the optical fiber extending out of the optical waveguide device looks like a tail of a pig, the above coupling process is called "Pigtailing".

In this connection, when a space is formed between the end face of the optical fiber and that of the optical waveguide or the optical axes of these end faces are not aligned with each other, there may be an increase in the light transmission loss, and thus these end faces have to be coupled with each other at a high precision. Specifically, it is necessary to align the center of each optical fiber with the center of the corresponding optical waveguide at a precision of 0.5 μm or less. However, such high-precision aligning process requires an extremely high skill and much time. In fact, upon the alignment of the end faces of the optical waveguide and the optical fiber, a laser light beam is actually transmitted through them and an optical axis adjustment is performed such that an amount of transmitted laser light becomes maximum. This process is very difficult and time-consuming. Accordingly, the cost for this process is the highest in the whole manufacturing procedure.

The assembly of optical waveguide device and the optical fiber holding substrate is then housed within a package. Accordingly, due to considerable changes of ambient temperature, undesirable changes may be caused in the light transmission loss even when the end faces of the optical fibers and optical waveguides have been optically coupled with each other at a high precision. Although, it is seriously needed to avoid these changes in the light transmission loss, it is very difficult because these changes are mainly caused by the difference between thermal expansion coefficients of the coupled elements.

Meanwhile, similar to semiconductor substrates, optical waveguide substrates are generally produced by a photolithographic technique. For example, when an optical waveguide is formed by the inward diffusion of titanium, a wafer substrate having a diameter of 3 inches which is made of $LiNbO_3$ monocrystal is first provided with a photo mask having a predetermined pattern, and then a titanium film is deposited on the wafer. After removing the photo mask, the wafer is subjected to a heat treatment to diffuse titanium into the wafer substrate to obtain the desired titanium-diffused optical waveguide. Then, a predetermined number of optical waveguide substrates are cut out from this substantially circular wafer. Accordingly, in order to reduce the manufacturing cost of the optical waveguide device, it is necessary to increase the number of optical waveguide substrates cut out from a single wafer, and this may be attained by shortening the length of each optical waveguide substrate.

However, the optical waveguide substrates have conventionally required a length of around 27–50 mm and thus, it has been difficult to shorten the length of the substrate beyond such limitation due to the reasons described later. As a result, it has been only possible to cut off a few optical waveguide substrates from a single wafer.

Accordingly, an object of the present invention is to reduce the production cost of branch-type optical waveguide devices by making a coupling process easier than the conventional one upon coupling an end face of an optical waveguide with an end face of an optical fiber.

Another object of the present invention is to avoid changes in the light transmission loss caused by a large change of the ambient temperature, which happens after the coupling of respective optical fibers with respective optical waveguides effected by joining an optical waveguide device with an optical fiber holding substrate.

It is still another object of the present invention to shorten the length of optical waveguide devices having a branch-type waveguide in order to remarkably increase the number of optical waveguide devices which can be cut out from a single wafer.

According to the present invention, an optical waveguide device comprises: an optical waveguide substrate, said optical waveguide substrate being provided with a branch-type optical waveguide, which waveguide includes a stem portion provided between one end face and the other end face of the optical waveguide substrate and a plurality of branch portions arranged in parallel with said stem portion; and a reflecting means for reflecting light propagated through the stem portion and transmitting the reflected light toward the branch portions.

The present invention also relates to an assembly of an optical waveguide device and an optical fiber holding substrate, wherein the optical fiber holding substrate is coupled with one end face of the optical waveguide substrate; optical fibers respectively corresponding to the stem portion and the plural branch portions of the optical waveguide are held by the optical fiber holding substrate; and the optical fibers are respectively coupled with the stem portion and the plural branch portions at end faces thereof.

The inventor has thought of a structure, in which light impinging on one end face of the optical waveguide substrate is reflected by the reflecting means arranged on the other end face of the optical waveguide substrate without emanating from the other end face, and the reflected light is made incident upon a turning portion provided in a vicinity of the reflecting means, so that the light transmitted through the stem portion is reflected by the reflecting means and then propagates along the turning portion toward the branch portion to emanate therefrom.

With this constitution, the light can emanate from the same end face of the optical waveguide substrate on which it has been made incident. Therefore, all the necessary couplings of optical fibers with optical waveguides can be accomplished by joining an optical fiber holding substrate only to one end face of the optical waveguide substrate. That is, all portions of the waveguide, namely the stem portion and the branch portions, can be coupled with corresponding optical fibers by a single "Pigtailing" process. Accordingly, since only one "Pigtailing" process is required in the entire manufacturing procedure of the optical waveguide device, time and cost for "Pigtailing" can be reduced by half.

Moreover, in the thus-obtained coupled body of an optical waveguide device and an optical fiber holding substrate, once the optical fibers and the optical waveguides are coupled with one another at a high precision, the transmission loss of light caused by a change of ambient temperature can be considerably suppressed even if the ambient temperature is greatly varied after the coupling as much as $-40°$ C. $\sim 80°$ C.

More specifically, in the coupled body of the optical waveguide device and the optical fiber holding substrate shown in FIG. 2, the optical fiber 3A is coupled with the optical waveguide device 5 at one end face of the device and the optical fibers 3B and 3C are coupled with the optical waveguide device 5 at the other end face of the device. Accordingly, due to the difference between thermal expansions of the optical fiber and the optical waveguide substrate caused by a temperature change, there is generated a tensile stress in each coupled portion of the optical fiber and waveguide, and this tensile stress is considered as the cause of transmission loss in this portion. In the present invention, however, all the optical fibers are coupled with the corresponding waveguides at the same one end face of the optical waveguide substrate. Accordingly, even when the optical waveguide substrate shrinks due to the temperature change, it is not the end face at which the optical fibers are coupled but the other end face that is slightly moved because of the shrinkage. As a result, a tensile stress is not generated in any coupled portion of the optical fiber and the optical waveguide.

Furthermore, in the optical waveguide device according to the present invention, light guided from one end face of the optical waveguide substrate is reflected by the reflecting means arranged on the other end face toward respective branch portions and emanates from the same end face. Therefore, even when the length of the optical waveguide substrate is reduced to a half of the length of the optical waveguide substrate shown in FIG. 2, the stem and branch portions of the waveguide can be substantially equal in length with those of the optical waveguide substrate shown in FIG. 2. That is, in the present invention, the length of the optical waveguide device can be reduced to a half of the length of the device shown in FIG. 2 while the stem and branch portions have necessary lengths. Accordingly, the number of optical waveguide devices cut out of a single wafer can be remarkably increased by reducing the length of each optical waveguide device. In this connection, when the length of each optical waveguide substrate is reduced by half, there is not only an advantage that the number of substrates cut out from a wafer is doubled, but also an advantage that additional substrates may be cut out of such portions of the wafer that do not have enough length for conventional substrates and thus have not been utilized. When the optical waveguide substrate of the present invention is formed to have substantially the same length as that of the optical waveguide substrate in FIG. 2, the stem and branch portions of the waveguide are secured to have a length twice as long as those of the device in FIG. 2. This is also true of the dividing portions. Accordingly, even with a substrate having a length equal to the conventional one, the optical waveguide device of the present invention can have a longer waveguide, thereby its application is widened.

It is preferable to provide the waveguide with a dividing portion which is continued to both of the stem portion and the branch portions and having a turning portion for optically coupling the stem portion and the branch portions, so that the light transmitted through the stem portion is passed through the dividing portion and then is reflected at the turning portion toward each branch portion.

BRIEF DESCRIPTION OF THE DRAWINGS

The present invention will be explained further in detail with reference to the attached drawings.

FIG. 8 is a plan view showing an optical waveguide device 25 manufactured by forming a groove 28 on the optical waveguide substrate 26 in a position around an end face 26b and arranging a reflecting member 29 on a surface 28a of the groove 28, which surface being opposed to a stem portion 17a;

DESCRIPTION OF THE PREFERRED EMBODIMENTS

Figure 3:
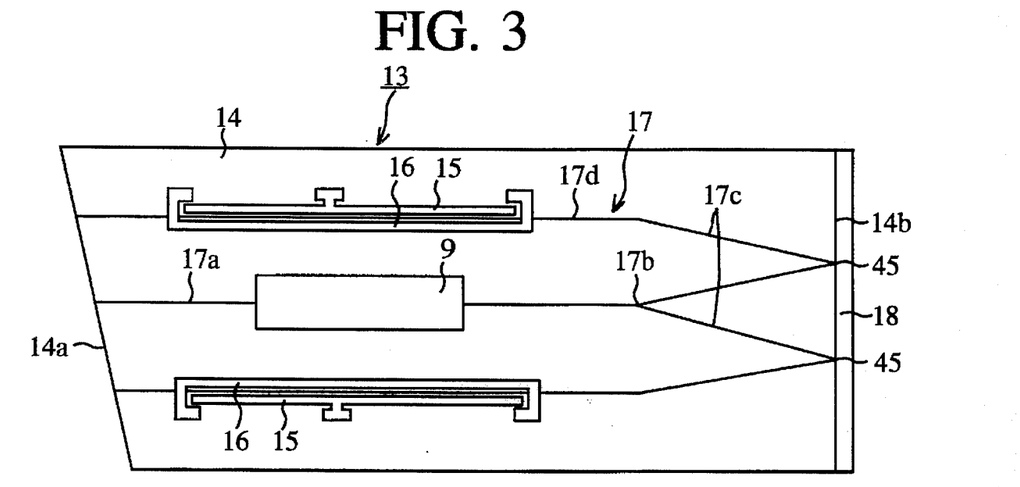
FIG. 3 is a plan view showing an optical waveguide device 13 as an embodiment of the present invention.
Figure 4:
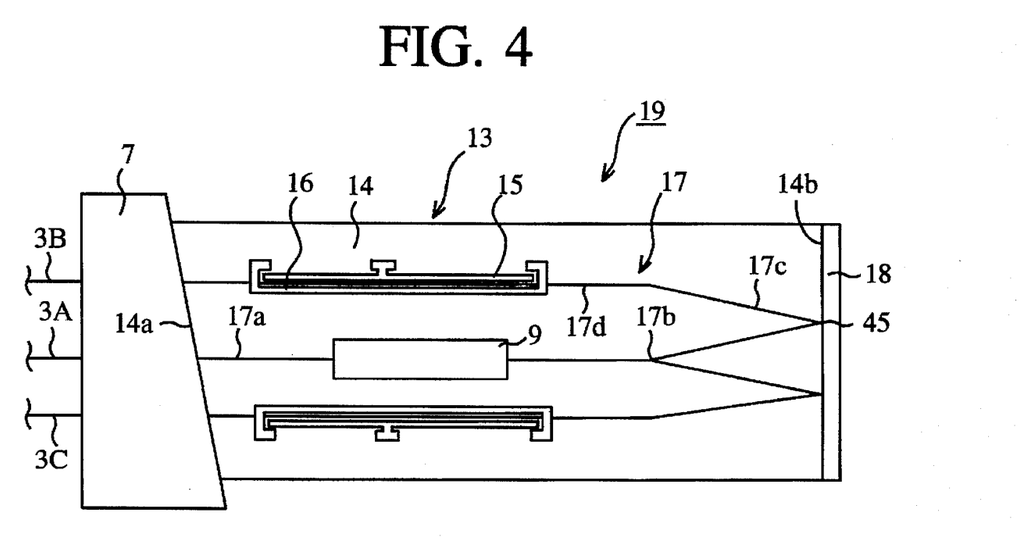
FIG. 4 is a plan view depicting an assembly 19 including the optical waveguide device 13 shown in FIG. 3 and an optical fiber holding substrate 7, said assembly being formed by joining the optical fiber holding substrate 7 with an end face 14a of the optical waveguide device 13 so as to respectively couple optical fibers 3A, 3B and 3C with stem and branch portions of the waveguide.
Figure 5A:
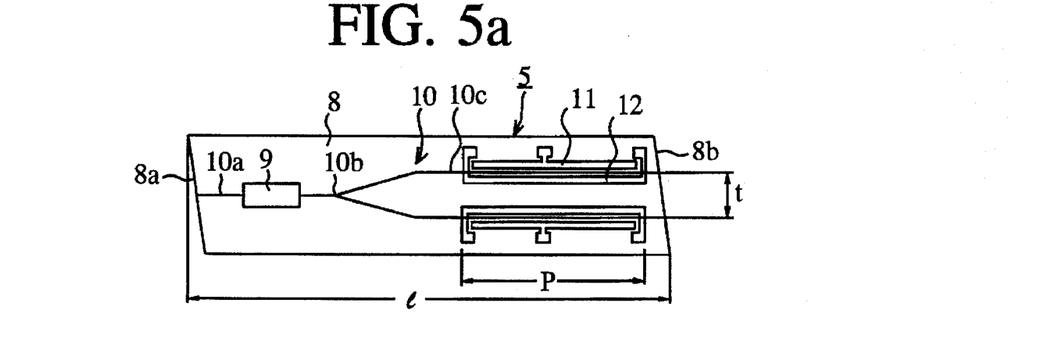
FIG. 5(a) is a plan view for explaining sizes of respective portions of the optical waveguide device 5 shown in FIG. 2.
Figure 5B:
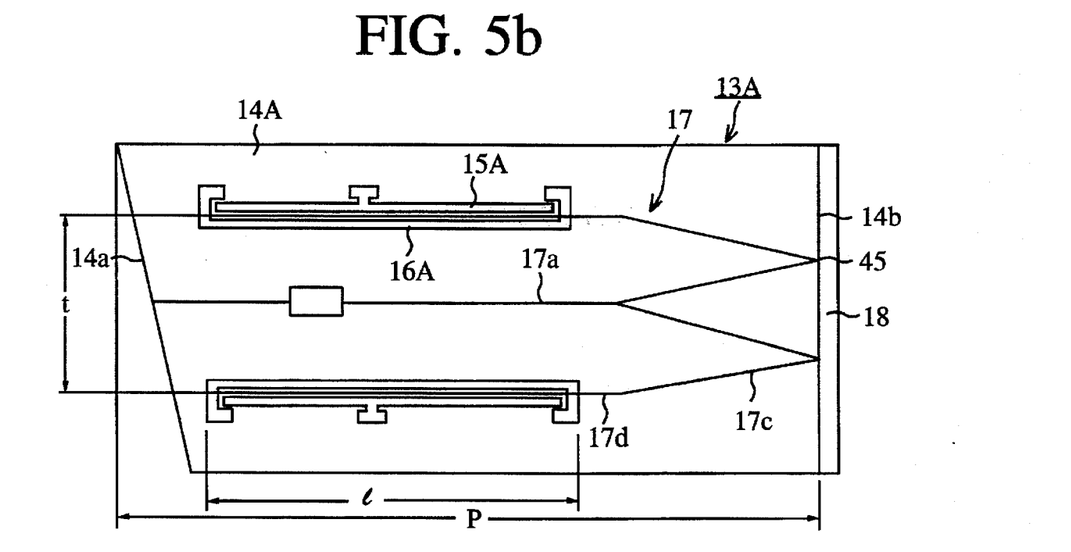
FIG. 5(b) is a plan view for describing sizes of respective portions of the optical waveguide device shown in FIG. 3 in a case where the device has substantially the same length as that of the device shown in FIG. 2.
Figure 5C:
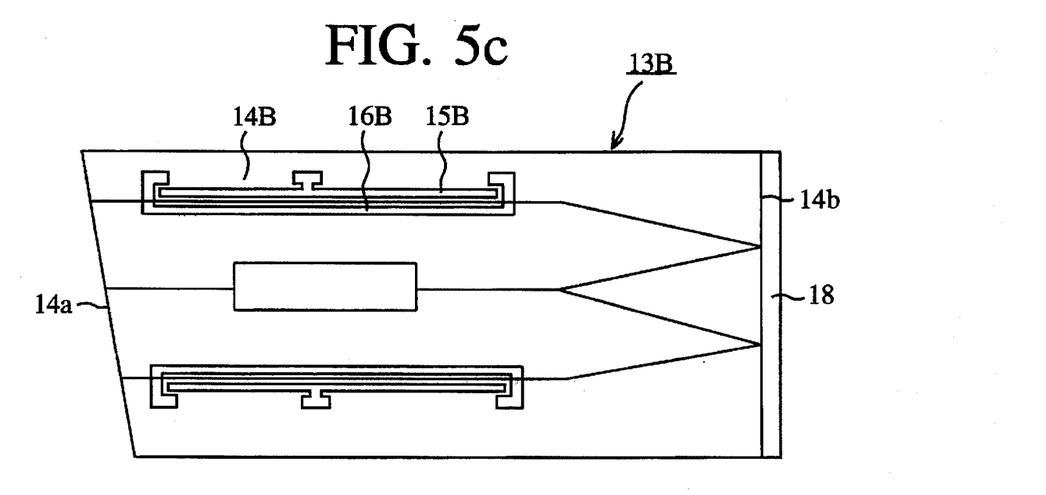
FIG. 5(c) is a plan view for explaining sizes of respective portions of the optical waveguide device shown in FIG. 3 in a case where the length of the device is considerably reduced when compared with that of the device shown in FIG. 2.

First of all, the present invention is explained further in detail referring to FIGS. 3–5. An optical waveguide device 13 shown in FIG. 3 is composed of an optical waveguide substrate 14 and a reflecting member 18. A continuous, branch-type optical waveguide 17 is provided on the optical waveguide substrate 14. A stem portion 17a and two rows of branch portion 17d extend in parallel with each other from one end face 14a of the optical waveguide substrate 14 to the other end face 14b. In this embodiment, the stem portion 17a and each branch portion 17d are substantially parallel with each other. A polarizer 9 is provided on the stem portion 17a. A dividing point 17b is provided at an end of the stem portion 17a and dividing portions 17c are continued from the dividing point 17b toward the right side thereof. In this embodiment, the dividing portions 17c extend toward the other end face 14b and are respectively provided with turning portions 45 in a vicinity of the other end face 14b. A reflecting member 18 is arranged on the other end face 14b. The dividing portions 17c are respectively continued to branch portions 17d, and controlling electrodes 15 and 16 are provided along each branch portion 17d to control the branch portion. The electrodes 15 and 16 are connected to a power supply system not shown so that a predetermined voltage can be applied to the electrodes at any desired time.

In order to couple optical fibers with the waveguide 17, an optical fiber holding substrate 7 is brought into contact with the end face 14a of the optical waveguide substrate 14 and adhered thereto. In this connection, optical fibers 3A, 3B and 3C are fixedly held by the optical fiber holding substrate 7. In a typical holding substrate of this type, optical fibers are respectively arranged within a V-groove and fixed thereto by an adhesive. Since such optical fiber holding substrate and optical fiber array are well known, a further explanation on them is omitted.

An end face of the optical fiber 3A is coupled with that of the stem portion 17a, and end faces of the optical fibers 3B and 3C are respectively coupled with those of each branch portions 17d. At this stage, for the purpose of minimizing a transmission loss of light caused by coupling, the alignment of these end faces are usually adjusted by actually transmitting light through each coupled portion so that an amount of transmitted light becomes maximum. In this way, there is obtained an assembly 19 of the optical waveguide device 13 and the optical fiber holding substrate 7.

Characteristics of the optical waveguide device shown in FIGS. 3–4 defined in a comparison with the optical waveguide device 5 shown in FIG. 2 will be further explained with reference to FIGS. 5(a)-(c).

In FIG. 5(a), there is shown the entire configuration of the optical waveguide device 5 of FIG. 2. In this optical waveguide device, when light transmitted through an optical fiber is made incident on a stem portion 10a of an optical waveguide, mode of the impinging light is partially disturbed at an end face of the stem portion 10a. The disturbed mode of light, however, is gradually settled into a single mode during transmission of the light through the stem portion 10a. In this connection, if the light impinges on the dividing point 10b before the mode of light is settled into a single mode, scattering of the light at this point becomes large when compared with that in the case where the light in a single mode impinges on the dividing point 10b. Also, this Y-shaped dividing portion is originally designed to divide the impinging light at a certain power ratio (output ratio). However, if the light impinges on the Y-shaped dividing portion before the mode of light is settled into a stable single mode, the light may be divided at a varied output ratio.

Therefore, the stem portion 10a should have a sufficiently long length so that the mode of light can be settled into a single mode before arriving at the dividing point. It is generally considered that 5 mm or longer is required as a length of the stem portion 10a.

With regard to the Y-shaped dividing portion, it is necessary to have a dividing angle of 1°–5°. Each of branch portions 10c extending to the dividing point is coupled with an optical fiber at an end face 8b of the substrate, and for the purpose of coupling two separate optical fibers at the same end, it is required that a distance t between the branch portions 10c should be about 250 μm. Accordingly, the Y-shaped dividing portion should have a length of 3 μmm or more in order to satisfy the above conditions.

The lengths of controlling electrodes 11 and 12 on the optical waveguide substrate are varied depending on their uses. However, since what is called an electro-optic coefficient is constant in any substrate material, it is possible to calculate a minimum length of controlling electrodes which is required to change a phase of the light or the like in accordance with desired specifications. For example, in the case of an optical waveguide substrate for optical fiber gyroscopes, it is necessary for the controlling electrodes 11 and 12 to have an effective length p of 15–30 mm or longer in order to rotate the phase of the light by 2π(360°) on the waveguide, while suppressing the driving voltage V(2π) of the phase modulator to 5V or less. It is of course considered to raise the driving voltage further to realize shorter electrodes. However, since it is desired to decrease the driving voltage in view of the power consumption, it is not favorable to increase the driving voltage beyond 5V.

Furthermore, it is not possible to provide the controlling electrodes along the entire length of the branch portion 10c. That is, it is necessary for a branch portion to have, in both end portions thereof, a linear portion of about 2 mm extending beyond the length of the electrodes in order to transmit the light guided from the Y-shaped dividing portion or an end face of the branch portion toward a central part of the branch portion, which corresponds to the length of the controlling electrodes, while maintaining the light in a single mode.

Accordingly, in the case of the optical waveguide device for optical fiber gyroscopes, it is necessary for the waveguide substrate to have a length 1 of 27–50 mm and it is almost impossible to shorten the length further. This is essentially true of optical waveguide devices designed for other applications.

On the other hand, as illustrated in the device 13A of FIG. 5(b), when the length 1 of the optical waveguide substrate 14A of the present invention is equal to that of the waveguide substrate shown in FIG. 2 or FIG. 5(a), the stem portion 17a, the dividing portion 17c and the branch portions 17d can be quite long in their length. Specifically, they can be twice as long as those of the waveguide substrate shown in FIG. 2 or FIG. 5(a). This means that it is also possible to allow the controlling electrodes 15A and 16A to have a significantly long length. As a result, the driving voltage V(2π) of the controlling electrodes can be reduced, and this is quite advantageous.

In addition, when the length of the dividing portion 17c is twice as long as that of the waveguide substrate shown in FIG. 5(a), the distance between the branch portions 17d is consequently twice as wide as that in FIG. 5(a), and so that the distance t between the controlling electrodes corresponding to each branch portion 17d can be increased. As a result, with respect to the controlling electrodes 15A and 16A, there is not the slightest fear of being affected by a signal applied onto the adjoining pair of controlling electrodes 15A and 16A, and this leads to a further improvement in the reliability of the optical waveguide device.

As illustrated by a device 13B of FIG. 5(c), when the length 1 of an optical waveguide substrate 14B of the present invention is significantly shorter than that of the optical waveguide substrate in FIG. 5(a), lengths of the stem portion 17a, the dividing portions 17c and the branch portions 17d can be substantially equal to those of the waveguide substrate in FIG. 5(a). Consequently, the controlling electrodes 15B and 16B can also have a length substantially equal to that in FIG. 5(a). This means that the length of the optical waveguide substrate according to the present invention can be reduced up to by half of the conventional one, while fully maintaining the performance.

When the present invention is applied to an active-type optical waveguide device in which light modulating electrodes for modulating the light transmitted through the branch portion are provided along each branch portion, as shown by the examples in FIGS. 3–5, the device can enjoy such advantages, in addition to those described above, that the necessary driving voltage can be reduced by making the controlling electrodes longer as well as that the reliability of the device regarding the crosstalk of controlling signals can be further improved by increasing the distance between adjoining pairs of the controlling electrodes.

Incidentally, while the optical waveguide substrates usually have a width of about 2 mm, the distance between branch portions is as small as about 250 μm in the conventional waveguide substrate and as about 500 μm even in the present invention. If such a device is faithfully illustrated in figures, the waveguide and controlling electrodes are drawn too small to be distinguished when compared with the substrate. Therefore, in the attached drawings, the waveguides and controlling electrodes are illustrated larger than their actual proportion for the sake of convenience. Accordingly, although the width of the waveguide substrate of the present invention looks larger than that of the conventional one (owing to the size of the waveguide) when the device in FIG. 5(a) is compared with those in FIGS. 5(b) and 5(c), the actual width of waveguide substrate is too wide to be affected by the size of waveguide.

Incidentally, as is also clear from the above embodiments, the stem portion, branch portions and reflecting member should be geometrically arranged so that the light transmitted through the stem portion is reflected by the reflecting means toward the branch portions to impinge thereon. Particularly when a dividing portion comprising a turning portion is provided between the stem and branch portion, a half of the dividing portion continued to the branch portion is required to be symmetrical with the other half of the dividing portion continued to the stem portion with respect to a line perpendicular to the reflecting surface.

In the optical waveguide device according to the present invention, a reflecting member may be provided on the other end face of the optical waveguide substrate.

The optical waveguide substrate may also be provided with a groove in a position around the other end face; and the groove may be provided with a reflecting member on a surface opposing the stem portion of the waveguide.

This reflecting member can be composed of a vapor-deposited film of a metal or a dielectric material. This type of reflecting member is advantageous because it can be successively formed after the formation of electrodes in the case where the controlling electrodes are formed by vapor deposition method.

The reflecting member may also be composed of a plate member made of a reflecting material. In this case, after the formation of the waveguide and if necessary, the controlling electrodes as well as polarizer, the optical fiber holding substrate may be joined to the optical waveguide substrate without providing it with the reflecting member. With this constitution, it is possible to observe light which is made incident upon one end face of the waveguide substrate and emanating from the other end face thereof. Accordingly, adjustments of end faces to be coupled with each other can be conducted on every coupled optical fiber and optical waveguide by directly transmitting light therethrough. After completing the coupling of the optical fibers and waveguides in this manner, the plate member made of a reflecting material may be fixed onto the other end face of the optical waveguide substrate.

The reflecting member may cover the entire other end face of the optical waveguide substrate or the entire of the surface of the groove opposing to the stem portion. However, it is not necessary to cover these surfaces with the reflecting member. It is sufficient to cover at least portions situated around respective turning portions in order to prevent the desired polarized light from escaping therefrom.

Especially when the optical waveguide is produced by proton-exchange process, it is preferable to partially cover the other end face of the optical waveguide substrate or the surface of the groove opposing the stem portion with the reflecting member so that the portions situated around the turning portions of the waveguide are covered with it, while leaving other portions uncovered. The reason why this constitution is favorable is as follows. In the waveguide of this type, only the desired polarized light of a single mode is transmitted through the waveguide and thus, a polarizer is not necessary. Accordingly, unnecessary polarized light is transmitted through the substrate itself to the other end face thereof. Here, if the optical fiber device has the above-mentioned constitution, in which the other end face of the substrate is partially covered in the necessary portion situated around the turning portion of the waveguide, the unnecessary polarized light can exit from the other uncovered portions to the outside of the substrate. Therefore, there is not a problem in which the unnecessary polarized light is made incident again on the optical fibers.

Incidentally, in the optical waveguide substrate 14 shown in FIG. 4, the end face 14a has a predetermined inclination with respect to a plane perpendicular to the stem portion 17a, because the refractive index of the optical waveguide and that of the optical fiber are not matched at this end face 14a. In this case, the other end face 14b of the substrate can be formed perpendicularly with respect to the stem portion of the waveguide. However, since the end faces of the substrate are not parallel with each other in this case, more steps are needed for cutting optical waveguide substrates out from a wafer.

Accordingly, when one end face of the substrate has a predetermined inclination with respect to a plane perpendicular to the stem portion, it is preferable to make the other end face of the substrate substantially parallel with the above end face, because parallelogrammic substrates can be easily cut out from the wafer with fewer steps.

In the present invention, optical waveguide substrates may be made of ferroelectric monocrystals. As the ferroelectric monocrystals, it is preferable to use one or more ferroelectric monocrystals selected from the group consisting of $LiNbO_3$, $LiTaO_3$, $Li(Nb_x, Ta_{1-x})O_3$, $BaTiO_3$, $ZnO$, $NH_4H_2PO_4$, $KH_2PO_4$ and $KTiOPO_4$. It is more preferable to use one or more ferroelectric monocrystals selected from the group consisting of $LiNbO_3$, $LiTaO_3$ and $Li(Nb_x, Ta_{1-x})O_3$. In this case, it is preferred to use the following kinds (1) and (2) of optical waveguides.

(1) An optical waveguide formed by thermally diffusing titanium, copper or the like into a ferroelectric monocrystal.

(2) An optical waveguide formed by proton-exchange process in which lithium atom in $LiNbO_3$ crystal, $LiTaO_3$ crystal or $Li(Nb_x, Ta_{1-x})O_3$ crystal is exchanged by hydrogen atom.

In addition, the present invention can be applied to optical waveguides of ridge type, of dielectric load type, of metal load type, etc.

Furthermore, the present invention can also be applied to optical waveguide substrates of other kinds such as glass substrates, in which an optical waveguide may be formed by metal ion-exchange process, as well as resin substrates provided with an optical waveguide.

In the optical waveguide device according to the present invention, the optical waveguide is divided into a plurality of rows; and a planar shape of the stem portion and branch portions of the waveguide may be a linear or a curved.

The dividing portion of the waveguide may be formed as a Y-shaped dividing portion. Also, the dividing portion of the waveguide may be composed of what is called a directional coupler. The directional coupler is constituted by arranging adjacent optical waveguides closely, and it transports guided light from one optical waveguide to the other optical waveguide. Therefore, the light transmitted from the input side can be divided by this directional coupler. Moreover, the directional coupler may be used together with the above Y-shaped dividing portion.

The optical waveguide device according to the present invention can be used as both of the active device and passive device. As for the passive device, mention may be made of beam splitter; and examples of the active device may include phase modulator, optical switching device, opto-acoustic device, logic device of optical computer (AND element, OR element) and the like.

The present invention can be further applied to an optical waveguide substrate provided with a cascade construction of waveguides comprising a plurality of dividing portions. As for devices with such a constitution, mention may be made of star coupler, multiple modulator in which a star coupler is provided with light modulating electrodes, multiple switching device including a star coupler with a switching function, and the like.

Figure 6A:
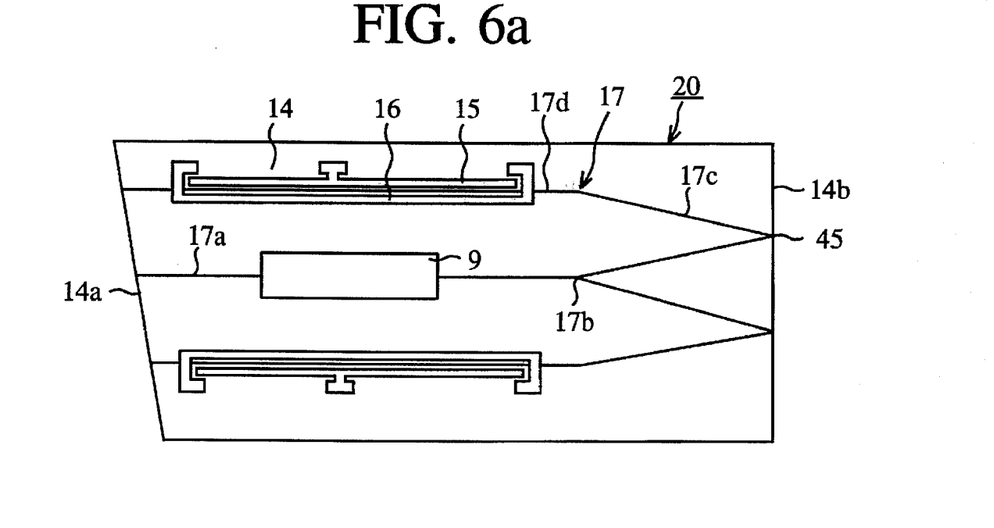
FIG. 6(a) is a plan view illustrating a substrate chip or assembly 20 cut out from a wafer to produce the optical waveguide device 13 shown in FIG. 3.

Next, explanation will be made on a manufacturing method of the optical waveguide device shown in FIGS. 3 and 4. At first, an assembly 20 shown in FIG. 6(a) is manufactured. At this stage, an optical waveguide 17, controlling electrodes 15 and 16, and a polarizer 9 are formed on a wafer made of a given material mentioned before, and then the assembly 20 is cut out from the wafer. These processes may be conducted by a known method.

Figure 6B:
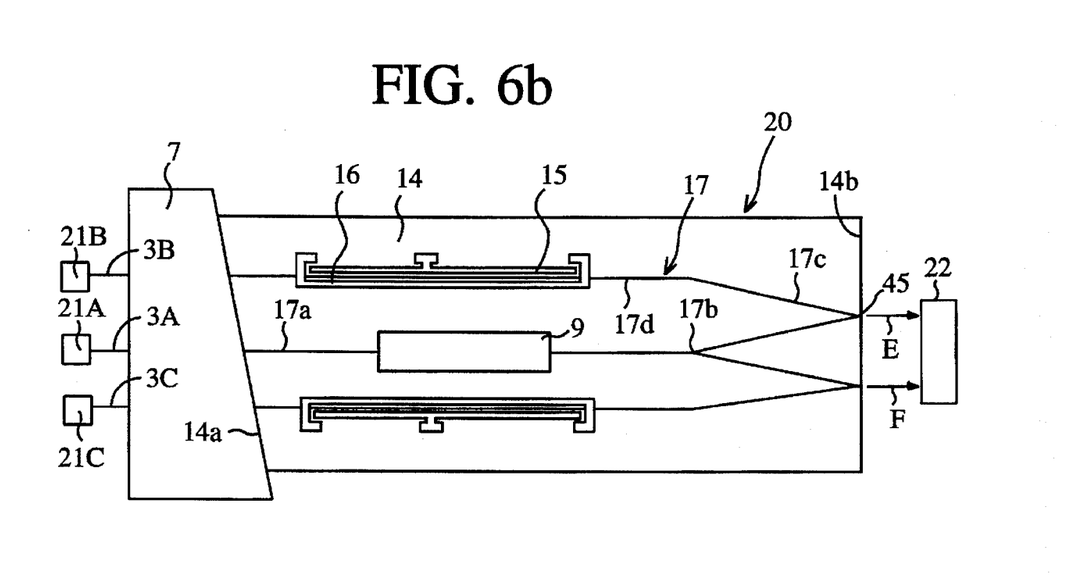
FIG. 6(b) is a plan view schematically showing a measuring process in which coupling loss of light is measured in each coupled portion between the optical fiber and the waveguide, said coupled portion being obtained by joining the substrate chip 20 with the optical fiber holding substrate 7.

Then, in one method, an optical fiber holding substrate 7 is joined to one end face 14a of the waveguide substrate as shown in FIG. 6(b). At this time, it is required to couple each optical fiber with a corresponding waveguide at a high precision as described before. In this embodiment, light sources 21A, 21B and 21C are respectively connected to the optical fibers 3A, 3B and 3C and a light receiving element 22 is arranged beside the other end face 14b of the optical waveguide substrate. The light emitted by a light source 21B propagates along the optical fiber 3B, the branch portion 17d and the dividing portion 17c, and then is transmitted through the turning portion 45 to impinge on the light receiving element 22 as shown by an arrow E. The coupled portion of the optical fiber 21B and the waveguide is finely adjusted by measuring an amount of received light. An amount of light emanated from the turning portion 45 as shown by an arrow F is also measured for the similar adjustment conducted on the optical fiber 3C. With respect to the optical fiber 3A, since the light emitted by the light source 21A is divided at the dividing point 17b, it is necessary to respectively measure amounts of divided light fluxes emanating from two separate points as shown by the arrows E and F. It should be noted that a single light source may be used instead of the light sources 21A, 21B and 21C.

After joining the assembly 20 with the optical fiber holding substrate 7 while adjusting the coupling alignments, a reflecting member is provided on the other end face 14b of the optical waveguide substrate to obtain the assembly 19 shown in FIGS. 3 and 4.

Figure 7:
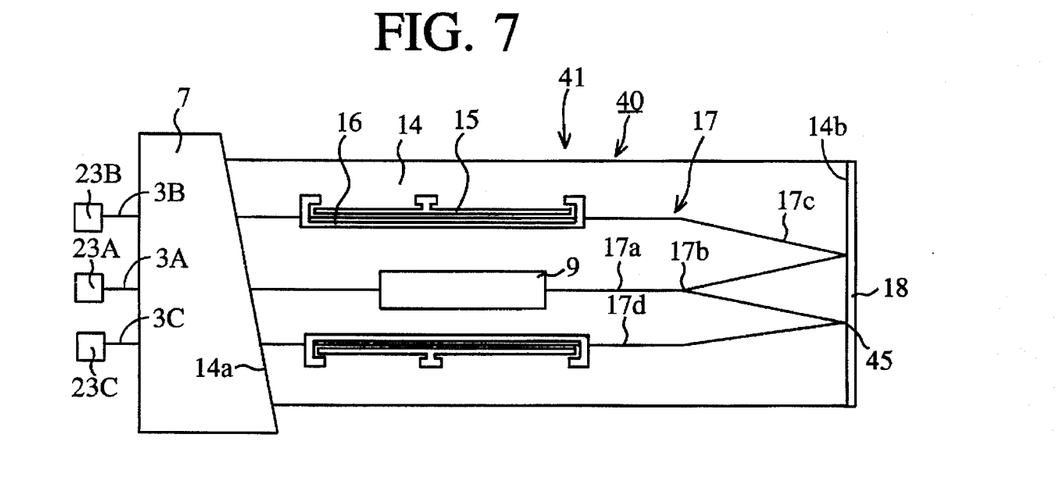
FIG. 7 is a plan view depicting an assembly 40 including an optical waveguide device 41 manufactured by forming a vapor-deposited film 37 of a metal or a dielectric material on an end face 14b of an optical waveguide substrate 14 and the optical fiber holding substrate 7.

In another method, after the formation of the assembly 20 shown in FIG. 6(a), the reflecting member 18 is provided on the end face 14b of the optical waveguide substrate to form an optical waveguide device 41 as shown in FIG. 7. Then, the optical fiber holding member 7 is joined to the optical waveguide device 41 to obtain an assembly 40. In this connection, when controlling electrodes 15 and 16 are formed by vapor deposition method, it is preferable to use a vapor-deposited film of a metal or a dielectric material as the reflecting member 18. However, a plate member may be generally used as the reflecting member 18.

In this case, alignment of respective optical fibers with respect to the waveguide may be performed in the following manner. First, light sources 23A, 23B and 23C respectively having light receiving elements are connected to the corresponding optical fibers. Light emitted by the light source 23B is transmitted through the optical fiber 3B, waveguide 17 and then optical fiber 3A. Light emitted by the light source 23C is transmitted through the optical fiber 3C, waveguide 17 and then optical fiber 3A. Light emitted by the light source 23A is transmitted through the optical fiber 3A and stem portion 17d of the waveguide 17 and then is divided at the dividing point 17b. The divided light fluxes respectively propagate through the branch portions 17d and then, the optical fiber 3B or 3C.

The fiber holding substrate and optical waveguide substrate are aligned such that a total amount of received light fluxes maximum, and are then secured to each other with an adhesive.

Figure 8:
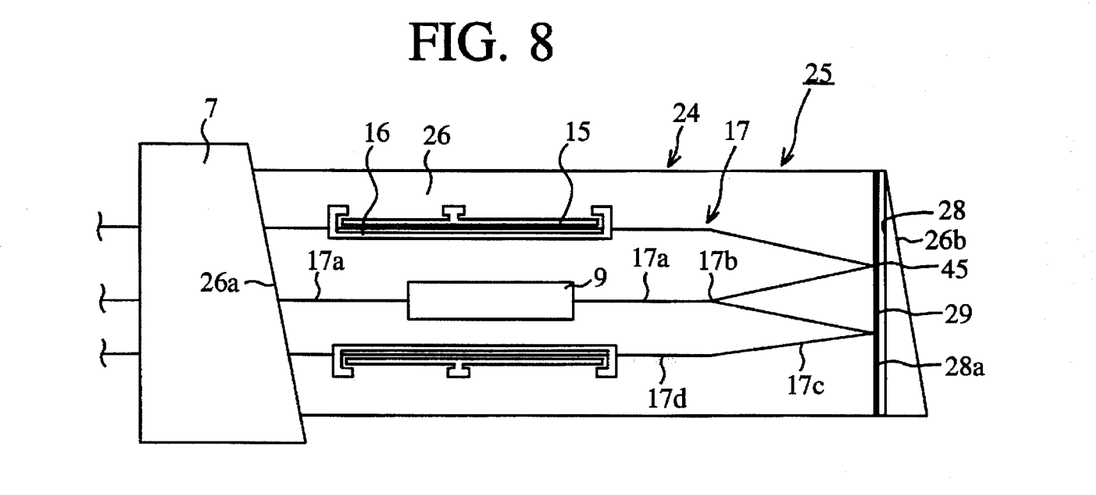

Referring to FIG. 8, there is made a modification on the configuration of an optical waveguide substrate 26 cut out from a wafer. Namely, one end face 26a of the substrate is formed substantially parallel to the other end face 26b, thereby making the optical waveguide substrate 26 have a parallelogrammic configuration. After cutting the optical waveguide substrate 26 out of the wafer, the groove 28 is formed on the optical waveguide substrate 26 so that it extends perpendicularly with respect to the stem portion 17a of the waveguide. The reflecting member 29 is then provided on the entire length of a surface 28a of the groove 28 opposing the stem portion. In this manner, there are produced an optical waveguide device 24 and an assembly 25.

Figure 9:
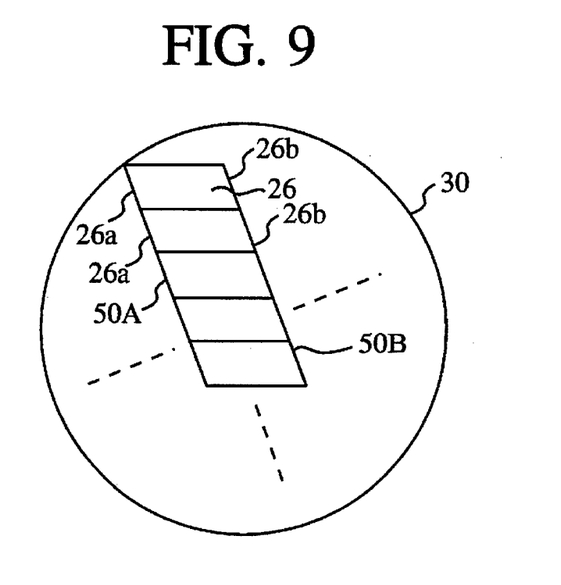
FIG. 9 is a plan view representing a dividing method in which optical waveguide substrates 26 are cut out from a wafer 30.

When each optical waveguide substrate 26 is formed to have a parallelogrammic planar configuration, all the end faces 26a of the substrates cut out of the wafer 30 as well as the end faces 26b thereof can be aligned linearly as schematically shown in FIG. 9. If the thus-formed straight lines are utilized as cutting lines 50A and 50B along which the wafer is cut, a larger number of optical waveguide substrates can be cut out of the wafer with fewer cutting steps.

Figure 10:
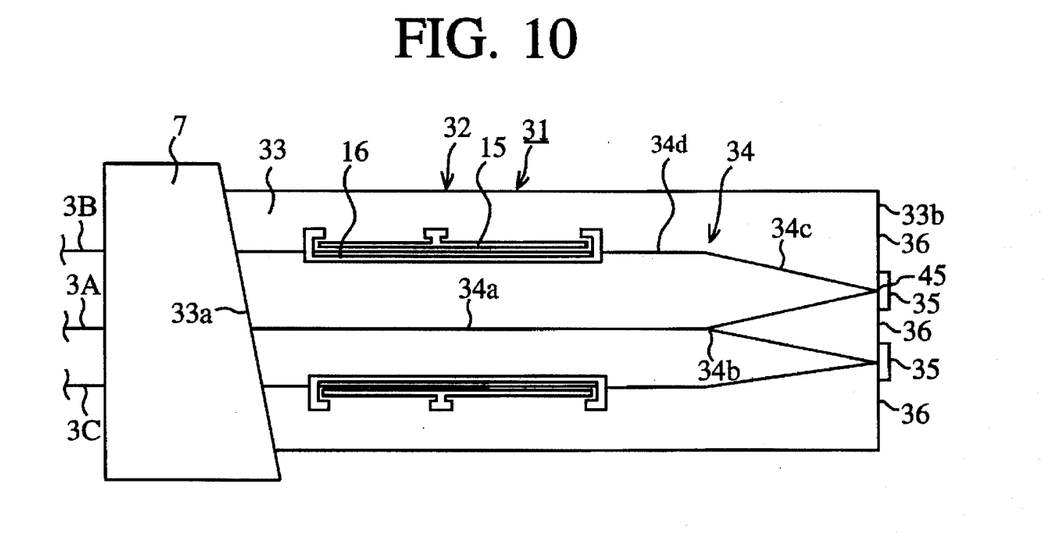
FIG. 10 is a plan view illustrating an optical waveguide device 32 in which the other end face 33b of an optical waveguide substrate 33 is covered with a reflecting member 35 at predetermined portions, while leaving the other portions 36 uncovered.

In another embodiment depicted in FIG. 10, a substrate for a single-mode waveguide is used as an optical waveguide substrate 33. A waveguide produced by proton-exchange process is preferably utilized as a single-mode waveguide. In this embodiment, an optical waveguide 34 is a single-mode waveguide and composed of a stem portion 34a, a dividing point 34b, a dividing portion 34c and a pair of branch portions 34d. An end face 33a has a predetermined inclination with respect to a plane perpendicular to the stem portion 34a, and the other end face 33b is substantially perpendicular to the stem portion 34a. On the other end face 33b, reflecting members 35 are provided so that they respectively cover portions near respective turning portions 45. The reflecting members 35 are separated from each other and thus, they are not continued to or in contact with each other. The end face 33b itself is exposed at portions 36 which are not covered with the reflecting member 35. In this manner, there are produced an optical waveguide device 32 and a coupled body 31.

The coupled body shown in FIG. 10 may be subjected to such modifications as described with reference to FIGS. 6–9.

A further concrete manufacturing example will be described below.

In this example, there were manufactured the optical waveguide device and coupled body shown in FIGS. 3 and 4. First, a disk-shaped wafer made of LiNbO$_3$ having x-cut plane was prepared. The wafer had a diameter of 3 inches and a thickness of 1 mm. A titanium thin film having a width of 3 μm and a thickness of 500 angstroms was formed on the wafer by photolithographic technique, and the wafer was subjected to a heat treatment at 1000° C. for six hours in an electric furnace to diffuse titanium into the LiNbO$_3$ wafer, thereby obtaining a titanium-diffused optical waveguide 17. Incidentally, the pattern of the waveguide can be varied by changing the mask in photolithography.

In this case, the optical waveguide substrates were formed to have a width of 1 mm; and it had a length of 32 mm in Example 1, and 20 mm in Example 2. After the formation of the waveguide 17, electrodes 15 and 16 respectively made of a metal film were provided on the wafer. These electrodes had a thickness of 2500 angstroms. In Example 1, respective electrodes had a length of 15 mm, and a gap distance between the adjacent pairs of electrodes was 250 μm . In Example 2, respective electrodes had a length of 15 mm, and the gap distance between the adjacent pairs of electrodes was 250 μm .

These substrates were cut out of the wafer and assemblies were formed by the method as illustrated in FIG. 6, except that a laser diode with 830 nm band was used as the light source and a multilayered film of dielectric material was used as the reflecting member 18.

The thus obtained assemblies were respectively installed in optical fiber gyroscopes and operation of these gyroscopes was confirmed. When laser light was made incident upon the optical fibers and the ambient temperature was varied within a rage of –40° C. ~80° C., it was confirmed that the loss of light was –1 dB or less.

In another example, a vapor-deposited film of a metal was provided on the other end face of the assembly as shown in FIG. 7 to be used as the reflecting member. An optical waveguide device was produced in the same manner as described above while using this assembly. Then, an assembly was manufactured by the method illustrated in FIG. 7 except that a laser diode with 830 nm band was used as the light source.

The thus obtained assembly was arranged within a fiber optic gyroscope and its operation was checked. When laser light was made incident upon each optical fibers and the ambient temperature was varied within a rage of –40° C. ~80° C., it was confirmed that the loss of light was –0.8 dB or less.

Although the invention has been described with reference to specific preferred embodiments, they were given by way of examples only and thus, it should be noted that various changes and modifications may be made on them without departing from the scope of the present invention as defined by the appended claims.

I claim:

1. An optical waveguide assembly, comprising:
    an optical waveguide substrate including a branch-type optical waveguide extending between first and second opposing end faces of the optical waveguide substrate, the optical waveguide including a stem portion extending from the first end face toward the second end face, a dividing point at which light propagating through said stem portion is divided, first and second dividing portions extending from said dividing point and through which divided light propagates from said stem portion toward said second opposing end face, and first and second branch portions extending to the first end face and parallel to the stem portion, such that the stem portion and first and second branch portions are exposed at said first end face;
    a reflecting means for reflecting light propagating through said first and second dividing portions respectively to said first and second branch portions; and
    an optical fiber holding substrate supporting optical fibers respectively in alignment with said stem portion and first and second branch portions along said first end face.

2. The assembly of claim 1, further comprising light modulating electrodes for modulating light propagating through said branch portions, said light modulating electrodes being arranged along said branch portions.

3. The assembly of claim 1, wherein said reflecting means comprises a reflecting member provided on said second end face of said optical waveguide substrate.

4. The assembly of claim 3, wherein said reflecting member comprises a vapor-deposited film of metal or dielectric material.

5. The assembly of claim 3, wherein said reflecting member comprises a plate formed of reflecting material.

6. The assembly of claim 3, wherein the entirety of said second end face of said optical waveguide substrate is covered by said reflecting member.

7. The assembly of claim 3, wherein said optical waveguide is formed by a proton-exchange process, and a portion of said second end face of said optical waveguide substrate is covered by said reflecting member.

8. The assembly of claim 1, wherein a groove is formed in said optical waveguide substrate at a position adjacent said second end face, said reflecting means including a reflecting member provided on a surface of said groove opposing said stem portion.

9. The assembly of claim 8, wherein said reflecting member comprises a vapor-deposited film of metal or dielectric material.

10. The assembly of claim 8, wherein said reflecting member comprises a plate formed of reflecting material.

11. The assembly of claim 8, wherein the entirety of said surface of said groove is covered with said reflecting member.

12. The assembly of claim 8, wherein said optical waveguide is formed by a proton-exchange process and a portion of said surface of said groove is covered by said reflecting member.

13. The assembly of claim 1, wherein said first end face of said optical waveguide substrate is inclined with respect to a plane perpendicular to said stem portion, and said second face is substantially perpendicular to said stem portion.

14. The assembly of claim 1, wherein said first end face of said optical waveguide substrate is inclined with respect to a plane perpendicular to said stem portion, and said second end face is substantially parallel with said first end face.

15. The assembly of claim 1, wherein said assembly provides an optical fiber gyroscope, and further comprises a light source and a light receiving element coupled to said stem portion of said optical waveguide via the optical fibers held by the optical fiber holding substrate, and a fiber coil coupled to said branch portions via the optical fibers.

* * * * *